E. A. SALTER.
CLUTCH AND ACTUATING MECHANISM.
APPLICATION FILED NOV. 15, 1915.
1,322,351.
Patented Nov. 18, 1919.
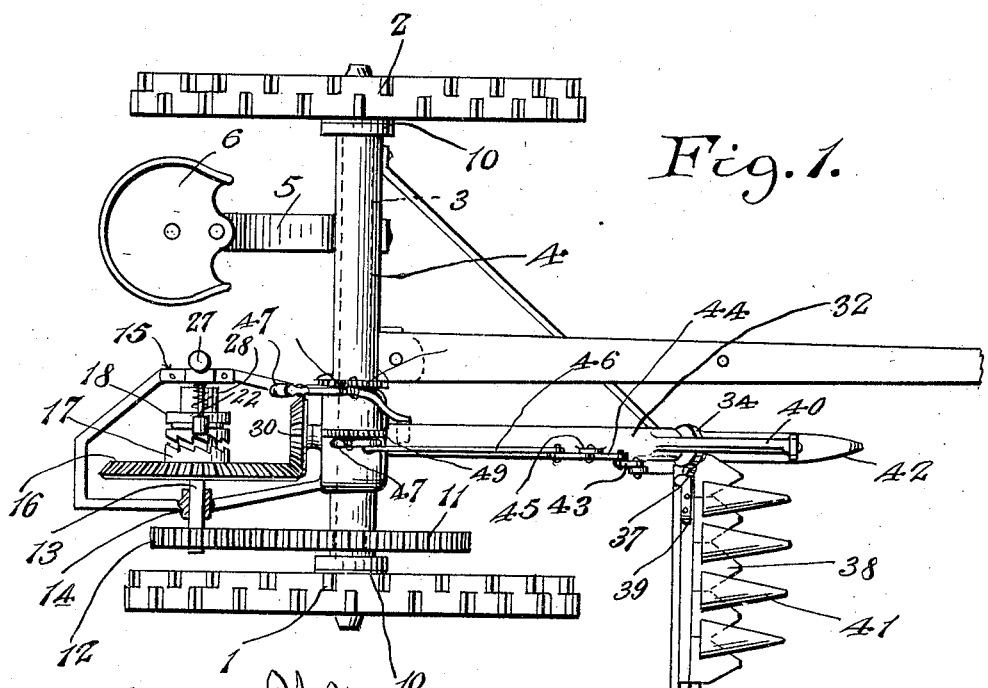
Fig. 1.
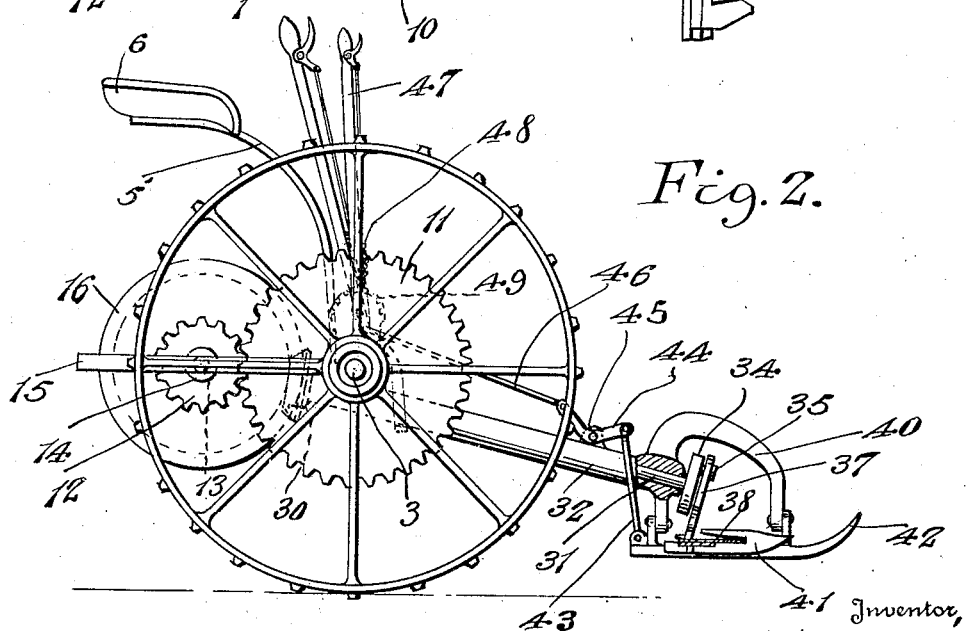
Fig. 2.
Witnesses:
Inventor,
E. A. Salter.
Attorney E. A. SALTER.
CLUTCH AND ACTUATING MECHANISM.
APPLICATION FILED NOV. 15, 1915.
1,322,351.
Patented Nov. 18, 1919.
2 SHEETS—SHEET 2.
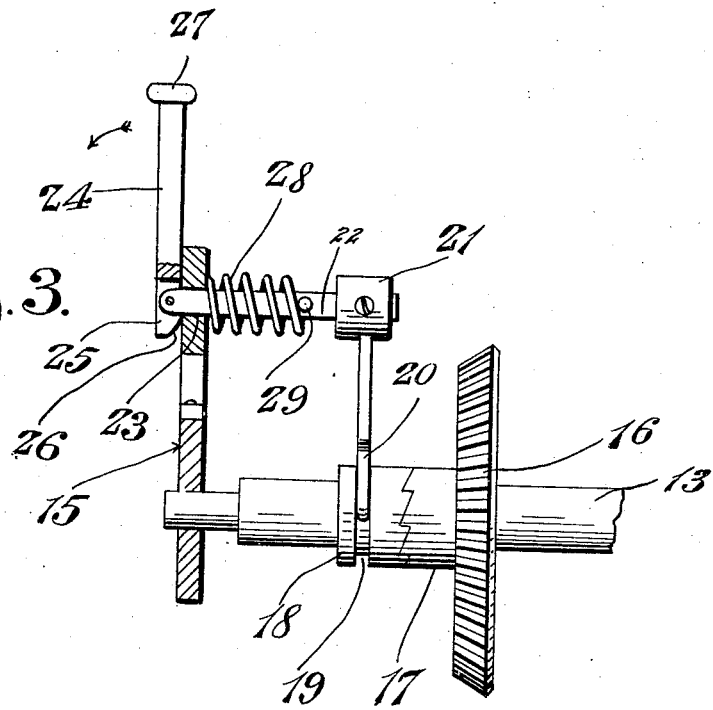
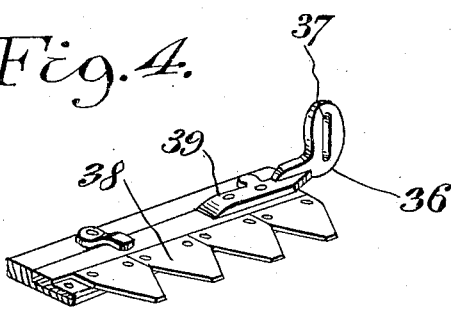
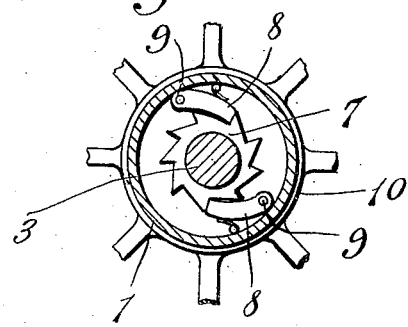
Witnesses
Inventor
E. A. Salter
By
Attorney

UNITED STATES PATENT OFFICE.

EDMOND ALFRED SALTER, OF PROVENCAL, LOUISIANA, ASSIGNOR OF ONE-HALF TO JOHN W. PAYNE, OF PROVENCAL, LOUISIANA.

CLUTCH AND ACTUATING MECHANISM.

1,322,351.  Specification of Letters Patent.  Patented Nov. 18, 1919.

Application filed November 15, 1915. Serial No. 61,592.

*To all whom it may concern:*

Be it known that I, EDMOND A. SALTER, a citizen of the United States, residing at Provencal, in the parish of Natchitoches and State of Louisiana, have invented certain new and useful Improvements in Clutch and Actuating Mechanism; and I do hereby declare the following to be a full, clear, and exact description of the invention, such as will enable others skilled in the art to which it appertains to make and use the same.

This invention relates to an improved clutch and actuating mechanism for the same and the principal object of the invention is to provide a clutch and actuating mechanism which may be used in connection with the gearing of a mowing machine and which will be so constructed that it may be very efficiently operated from the seat of the mowing machine to throw the movable clutch element out of engagement with the stationary clutch element and thus permit the mowing machine to be moved across a field without the cutting knives being operated.

Another object of the invention is to so construct this clutch and operating mechanism that it will comprise a comparatively few number of parts having a strong and durable construction and not liable to easily get out of order.

With the foregoing and other objects in view this invention consists in such novel features of construction, combination and arrangement of parts as will be hereinafter more fully described, illustrated in the accompanying drawing, and claimed.

In describing the invention in detail reference will be had to the accompanying drawing, wherein like characters designate like or corresponding parts throughout the several views, and in which:

Figure 1 is a plan view of the improved mowing machine, showing parts thereof broken away.

Fig. 2 is a side view of the mowing machine with parts broken away,

Fig. 3 is a detail view of the construction shown for controlling the operation of the sickle bar, Fig. 4 is a fragmentary perspective view of the sickle bar and sickle head, and Fig. 5 is a sectional view through the floating axle of the mowing machine, showing the manner in which it is operatively connected to the wheels of the machine.

Referring more particularly to the drawing, 1 and 2 designate the supporting wheels of the mowing machine, which are mounted upon the floating axle 3. The axle 3 is inclosed in a casing 4, as is ordinary in the construction of mowing machines. An ordinary seat standard 5 is connected to the casing 4 and has a seat 6 mounted thereon.

The supporting wheels 1 and 2 are loosely mounted upon the axle 3, and the axle is rotated by the rotation of the supporting wheels through the medium of a pawl and ratchet mechanism clearly shown in Fig. 5 of the drawing. The ratchets 7, one of which is positioned on each end of the floating axle 3, are keyed upon the axle for synchronous rotation therewith. Pawls 8 are pivotally connected, as is shown at 9, to the hub section of the supporting wheels 1 and 2 and engage the teeth of the ratchet 7 for rotating the axle 3 synchronously with the wheel during the forward travel of the mowing machine. In case the mowing machine is backed, the pawls 8 will ride over the teeth of the ratchet 7 and permit the wheels 1 and 2 to turn independent of the axle 3.

Inclosing housings 10 are mounted over the ratchets and pawls 7 and 8. A gear 11 is mounted upon the axle 3, and meshes with a pinion 12. The pinion 12 is carried by a shaft 13, which shaft is rotatably supported by suitable bearings 14 formed upon a housing 15. The shaft 13 has a relatively large bevel gear 16 loosely mounted thereon, said bevel gear having a clutch segment 17 formed upon the hub portion of the same. The clutch segment 17 is adapted for co-action with a clutch segment 18, which is feathered upon the shaft 13. The clutch segment 18 is provided with an annular recess 19, in which the ends of a forked arm 20 rest. The arm 20 has a collar 21 formed upon its upper end, which collar is rigidly connected to a rod 22. The rod 22, extends through an opening 23 formed in the side of the housing 15 and it is pivotally connected to a second rod 24. The end of the rod 24, to which the rod 23 is connected, is bifurcated, as is clearly shown at 25 in Fig. 3 of the drawing. The rod 24 projects beyond the pivotal point of connection with the rod 22, so that when it is moved outwardly, in the direction indicated by the arrow in Fig. 3 of the drawing, the end of the rod 24 will, upon engagement with the outer surface of the sides of the casing 15, move the rod 22 longitudinally, and consequently move the clutch segment 18 out of engagement with the clutch segment 19. The inner edge of the lower end of the rod 24 is curved, as is shown at 26, so as to provide for the riding of the edge of the rod over the face of the housing or casing 15 during its pivotal movement. A head 27 is formed upon the upper end of the rod 24. A spiral spring 28 is coiled about the rod 22, and one end of the spring engages the inner surface of the side of the housing 15, while the other end engages a pin 29 carried by the rod 22. The spring 28 is provided for automatically moving the rod 22 inwardly for moving the clutch segment 18 into engagement with the clutch segment 17 when the rod 24 is moved into the position, as illustrated in Fig. 3.

A bevel pinion 30 meshes with the bevel gear 16. The bevel pinion 30 is mounted upon a shaft 31, which is inclosed in a housing 32, and extends beneath the axle 3 of the mowing machine. The shaft 31 has a disk 34 mounted upon its forward end. A pin 35 is connected eccentrically to the disk 34, and it rides in a slot 37, which is formed in the upstanding head 36 of the sickle bar 38. The head 36 is formed upon a casting which has an attaching plate 39 formed thereon for attachment with the sickle bar 38, as is clearly shown in Fig. 4 of the drawing. When the shaft 31 is rotated, the disk 34 will be rotated synchronously therewith, which will cause the pin 35 to travel in a circle, and, owing to the fact that the pin is eccentrically connected to the disk and is seated in the slot 36, a reciprocatory movement will be imparted to the sickle bar 38. The casing 32 has an enlargement 40 formed thereon, which extends over the disk 34 and the head 36. The usual type of cutter bar guards 41 are provided.

The rear end of the shoe 42 of the cutter bar structure has a rod 43 connected thereto, which rod is in turn connected to one arm of a bell crank 44. The bell crank 44 is pivotally connected, as is shown at 45, to the casing 32. A rod 46 is connected to the arm of the bell crank 44 remote from the arm to which the rod 43 is connected, and to the lower end of a hand lever 47. The hand lever 47 is pivotally supported by the casing 4 and it has a dog mechanism 48 carried thereby, which co-acts with a quadrant 49 for holding the lever in adjusted position. The lever 47 is provided for raising or lowering the cutter bar structure.

From the foregoing description, it will be seen that a mowing machine which is comparatively simple in construction with respect to mowing machine ordinarily in use, is provided, and also a machine wherein the lost motion contingent with the employment of the pitman rod and the various mechanisms for operating the same is eliminated by the provision of the disk 34, the eccentrically mounted pin 35 and the head 37.

Having thus fully described the invention what is claimed is:

In a mowing machine, the combination of a frame, a shaft, a gear loosely mounted upon said shaft, a clutch section carried by said gear, a second clutch section feathered upon said shaft, a forked arm engaging said feathered clutch section, a rod connected to said forked arm and slidably mounted in the frame, resilient means yieldably retaining the rod in a set position with the clutch sections in engagement, an actuating lever pivotally connected to said rod, the end of said lever projecting beyond its pivotal connection with said rod for engagement with the frame upon pivotal movement of the lever whereby said rod will be moved longitudinally to move said feathered clutch section out of engagement with the clutch section carried by said gear.

In testimony whereof I affix my signature in presence of two witnesses.

EDMOND ALFRED SALTER.

Witnesses:
H. R. HAWTHORNE,
D. C. DALE.